United States Patent
Rinaldi (10) Patent No.: US 6,525,490 B1
(45) Date of Patent: Feb. 25, 2003

(54) POWER SAVING CIRCUITRY

(75) Inventor: Vito Rinaldi, Mississauga (CA)

(73) Assignee: Patricia Ann Bailey, Mississauga (CA)

( * ) Notice: Subject to any disclaimer, the term of this patent is extended or adjusted under 35 U.S.C. 154(b) by 0 days.

(21) Appl. No.: 09/676,089

(22) Filed: Oct. 2, 2000

(51) Int. Cl.[7] .............................................. H05B 37/02
(52) U.S. Cl. ...................... 315/291; 315/224; 315/194; 315/360; 323/223; 323/235
(58) Field of Search .................................. 315/291, 307, 315/224, 209 R, 207, 208, 194, DIG. 4, 360; 323/234, 235, 237, 223

(56) References Cited

U.S. PATENT DOCUMENTS

| | | | |
|---|---|---|---|
| 4,082,981 A | | 4/1978 | Morton et al. ................. 315/97 |
| 4,099,099 A | | 7/1978 | Grudelbach .................. 315/194 |
| 4,287,455 A | | 9/1981 | Drieu .......................... 315/199 |
| 4,350,935 A | * | 9/1982 | Spira et al. .................. 315/207 |
| 4,482,844 A | | 11/1984 | Schweer et al. ............. 315/194 |
| 4,527,099 A | * | 7/1985 | Capewell et al. ............ 315/205 |
| 4,528,482 A | | 7/1985 | Merlo ......................... 315/291 |
| 4,544,863 A | | 10/1985 | Hashimoto .............. 315/209 R |
| 4,567,425 A | | 1/1986 | Bloomer ..................... 323/237 |
| 4,633,161 A | | 12/1986 | Callahan et al. ............. 323/242 |
| 5,274,524 A | | 12/1993 | Pezzani et al. .............. 315/307 |
| 5,455,491 A | * | 10/1995 | Hajagos et al. ............. 315/158 |
| 5,500,575 A | | 3/1996 | Ionescu ........................ 361/56 |
| 5,519,311 A | * | 5/1996 | Widmayer ................... 315/194 |
| 5,530,521 A | * | 6/1996 | Lee .............................. 399/29 |
| 5,583,423 A | * | 12/1996 | Bangerter ................... 323/211 |
| 5,754,036 A | * | 5/1998 | Walker ....................... 323/235 |
| 6,118,228 A | * | 9/2000 | Pal .......................... 315/209 R |

FOREIGN PATENT DOCUMENTS

| | | |
|---|---|---|
| JP | 07 015960 A | 1/1995 |
| WO | WO 98/59420 | 12/1998 |

* cited by examiner

*Primary Examiner*—Don Wong
*Assistant Examiner*—Ephrem Alemu
(74) *Attorney, Agent, or Firm*—Ridout & Maybee LLP (57) ABSTRACT

A power control circuit for reducing AC power to a load, including a bilateral power control switch for connection in series with the load, a bilateral energy return switch for connection in parallel with the load, and a driver circuit connected to the switches. The driver circuit is configured to control the high speed power switches so that the energy return switch is closed when the power control switch is open; and vice-versa. A timer circuit is connected to the driver circuit and causes the power control switch to close and then open at least once during each half cycle of the AC current.

16 Claims, 4 Drawing Sheets

POWER SAVING CIRCUITRY

BACKGROUND OF THE INVENTION

The present invention relates to an AC power control circuit for use with various types of loads.

As energy costs increase and the use of electric lighting and motors expands, more and more attention is being given to the design of efficient electrical systems. SCR (Silicon Controlled Rectifier) and Triac based AC (alternating current) voltage controllers have long been in use for controlling resistive loads (i.e. loads in which there is no phase difference between the voltage and the current). There are also systems which have been proposed for controlling the AC power supply to non-resistive loads such as fluorescent lights. For example, U.S. Pat. No. 4,287,455 issued Sep. 1, 1981 to M. L. Drieu, discloses a control circuit which supplies current to one or more gaseous discharge lamps during an adjustable final portion of each half-cycle of the AC power supply. However, since this circuitry allows current to pass through the load only during the final portion of each half-cycle of the AC power supply, an inductive effect is produced, i.e. a time lag is created between the peak line voltage and the peak line current. This inductive effect affects the power factor. Since utility companies generally charge commercial users a higher rate if the power factor falls below a particular value (e.g. 90), the reduction in power occasioned by the use of some prior art power saving circuits may in some cases be offset by the higher rate charged by the utility company.

Prior art power saving circuits have been devised that control the AC power supplied to a load by using a form of reverse phase control whereby current flow begins at the beginning of an AC half-cycle but is terminated before the end of the half-cycle. By determining the point at which current flow is stopped, reverse phase control circuits can produce a capacitive effect. Circuits that employ reverse phase control have been disclosed in U.S. Pat No. 5,455,491 issued Oct. 3, 1995. However, the circuits disclosed in these patents do not function as well as might be hoped when used to control power supplied to fluorescent lights because the extended period of zero current near the end of each half-cycle can result de-ionization occurring in some fluorescent lamps. Additionally, these reverse phase control systems lack the flexibility to produce an inductive effect so that they can also be used to improve the power factor when used with a capacitive load.

Also, it is desirable to provide a simplified power control circuitry which allows control of very high power but which consumes very low amounts of power, and which can satisfactorily reduce power consumption while at the same time allowing for power factor control when used with an inductive, capacitive or resistive load.

BRIEF SUMMARY OF THE INVENTION

The present invention provides a power control circuit for connection to an AC supply circuit for supplying current to a load. The power control circuit reduces power consumption while drawing very low power itself According to one aspect of the invention, there is provided a power control circuit for connection to an AC supply circuit for supplying AC current to a load, comprising a bilateral, very high speed power control switch for connection in series with the load, a bilateral, very high speed energy return switch for connection in parallel with the load, and a driver circuit connected to each of the power control switch and the energy return switch for controlling the opening and closing of the switches. The driver circuit is configured to cause the energy return switch to be open when the power control switch is closed and the energy return switch to close when the power control switch opens. A timer circuit is operatively connected to the driver circuit for controlling the operation of the driver circuit so that the power control switch is closed for at least a predetermined initial time period and a discrete predetermined final time period during each half cycle of the AC current. The power control circuit also includes a power supply circuit for connection to the AC supply circuit for supplying power to the driver circuit and timer circuit.

According to another aspect of the invention, there is provided a power control circuit for connection to an AC supply circuit for supplying AC current to a load, comprising a bilateral power control switch for connection in series with the load, a bilateral energy return switch for connection in parallel with the load, and a driver circuit connected to each of the power control switch and the energy return switch for controlling the opening and closing of the switches, the driver circuit being configured to cause the energy return switch to be open when the power control switch is closed and the energy return switch to close when the power control switch opens. The power control circuit also includes a timer circuit operatively connected to the driver circuit for controlling the operation of the driver circuit so that the power control switch is successively closed and opened at least once during each half cycle of the AC current, and a power supply circuit for connection to the AC supply circuit for supplying power to the driver circuit and the timer circuit, the power supply circuit being a low power consumption circuit that includes a low power resistor means for connection in series with the AC supply circuit for reducing an AC line voltage to a voltage level suitable for application to the driver circuit and the timer circuit.

According to still a further aspect of the invention, there is provided a power control circuit for connection to an AC supply circuit for supplying AC current to a load, comprising, a bilateral power control switch for connection in series with the load, a bilateral energy return switch for connection in parallel with the load, and a driver circuit connected to each of the power control switch and the energy return switch for controlling the opening and closing of the switches, the driver circuit being configured to cause the energy return switch to be open when the power control switch is closed and the energy return switch to close when the power control switch opens. A timer circuit is operatively connected to the driver circuit for controlling the operation of the driver circuit so that said power control switch is successively closed and opened at least once during each half cycle of the AC current. The power control circuit also includes a power supply circuit for connection to the AC supply circuit for supplying power to the driver circuit and the timer circuit, and a high power, transient suppressor circuit including a bilateral suppressor for connection across the AC supply circuit and monitoring means operatively connected to the bilateral suppressor for monitoring the potential across the AC supply circuit and causing the bilateral suppressor to close when the potential exceeds a predetermined value.

DETAILED DESCRIPTION OF THE PREFERRED EMBODIMENTS

Figure 1:
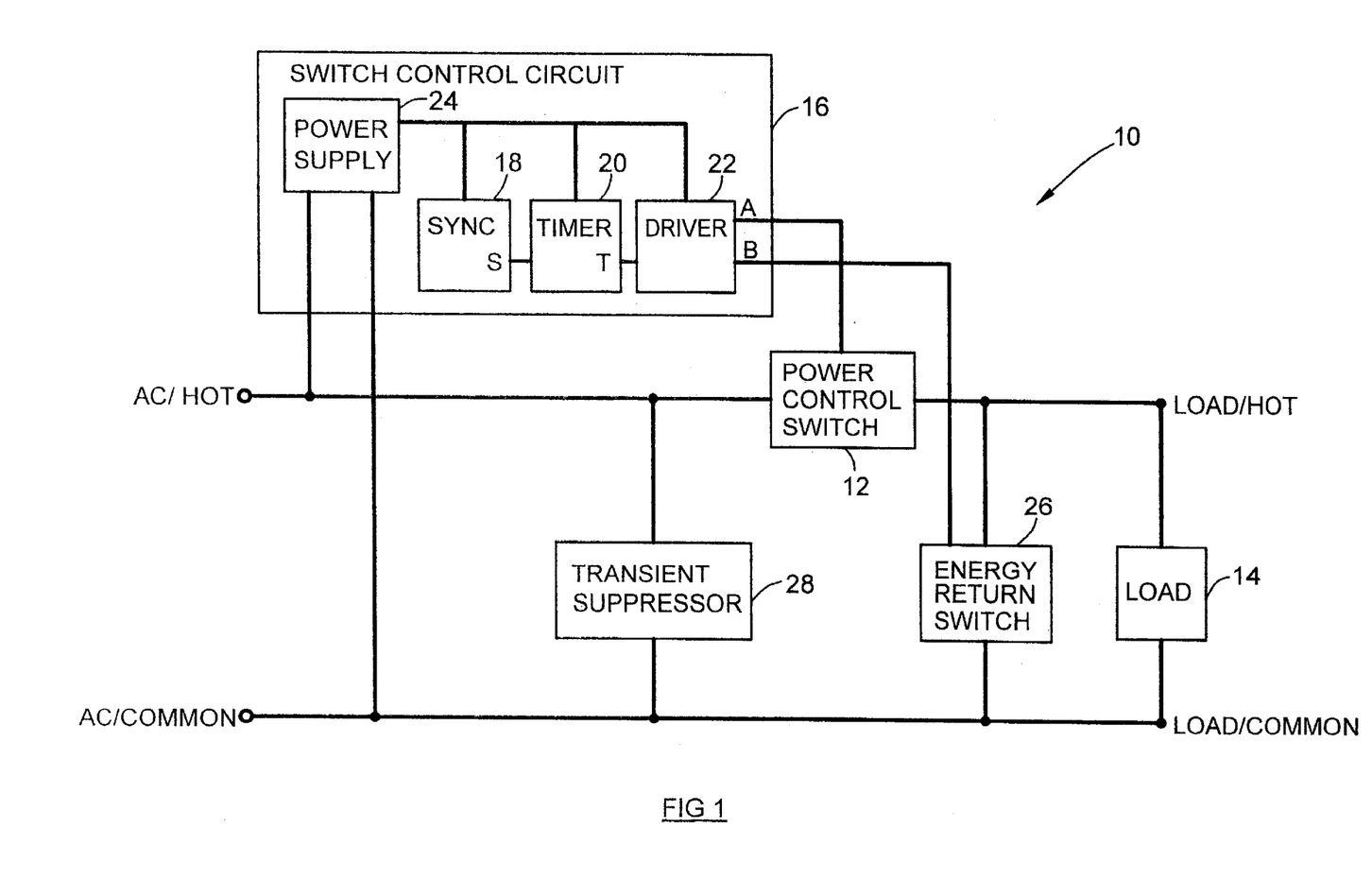
FIG. 1 is a block diagram of the preferred embodiment of the power control circuit of the present invention.

The power control circuit of the present invention, illustrated generally by reference numeral 10 in FIG. 1, includes a bilateral, very high speed power control switch 12 for switching on and off the current from an AC power supply to a load 14 during both the positive and negative half-cycles of the AC cycle. The bilateral power control switch 12 is referred to as being "bilateral" because it is capable of conducting and switching current of either polarity. The power control switch 12 is connected in series between the line terminal of an AC power supply and the load 14 and its operation is controlled by a switch control circuit 16, having the voltage wave forms shown in FIG. 2. The term "very high speed" when used herein to describe the power control switch 12 (or the energy return switch 26 referred to below) refers to a switch capable of providing a switch duration in the order of only a few nanoseconds or less.

Figure 2:
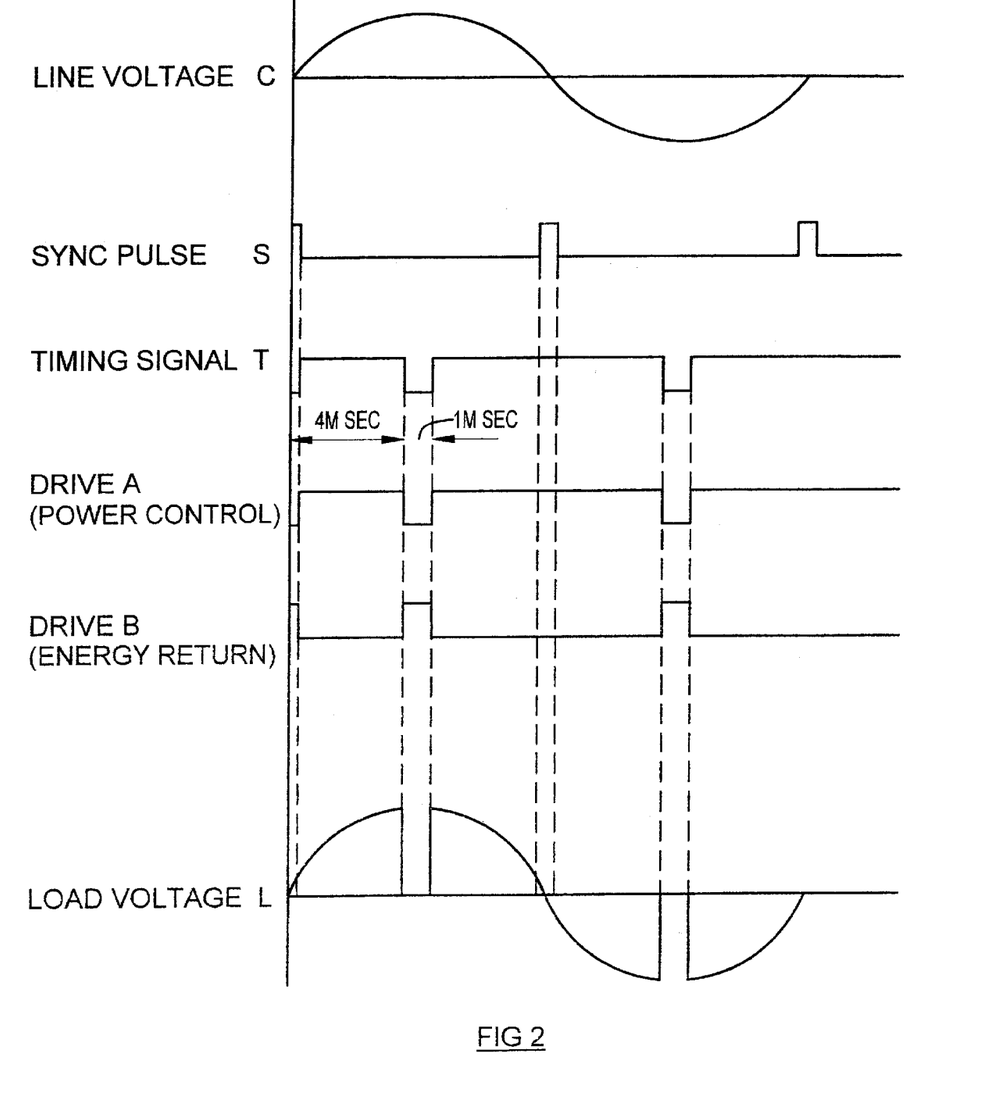
FIG. 2 shows the voltage wave forms generated by the power control circuit of FIG. 1.

The switch control circuit 16 includes a timing circuit which comprises a synchronization circuit 18, and a timer 20. The switch control circuit 16 also includes a driver circuit 22 and a power supply circuit 24 for supplying power to the circuits 18, 20 and 22. The synchronization circuit 18 includes a zero crossing detector and produces a synchronizing pulse S in phase with the AC line voltage C each half cycle as shown in FIG. 2. The synchronization circuit 18 is operatively connected to the timer 20 such that the synchronization pulse S causes the timer circuit 20 to produce a timing signal T which consists of at least one square wave pulse of adjustable predetermined duration. As illustrated in FIG. 2, the timer 20 has been configured to produce two square wave pulses, each pulse of adjustable pre-determined duration with the second pulse terminating at a predetermined interval before the end of each half cycle of line voltage C. The timing signal T is conducted to the driver circuit 22, which produces two output drive signals, A and B. The drive signal A controls the operation of the power control switch 12 such that the power control switch 12 conducts current when the drive A signal is high and is open when the drive A signal is low. The resulting load voltage L is shown in FIG. 2. The voltage wave forms shown in FIG. 2 cause a capacitive power effect, which may be used to compensate for the inductive power factor found in most commercial installations.

When the drive A signal from driver circuit 22 terminates, the power control switch 12 ceases conducting, and the voltage across the load 14 drops rapidly. If load 14 is inductive or capacitive, it contains stored energy and in order to make use of this stored energy, the power control circuitry 10 preferably includes bilateral energy return switch 26 which is connected in parallel with the load 14. The second driver output signal drive B controls the operation of the energy return switch 26 such that the energy return switch 26 conducts when the drive B signal is high and is open when the drive B signal is low. The driver circuit 22 is configured such that the drive B signal is substantially the opposite state of the drive A signal, thus causing the energy return switch 26 to conduct across the terminals of the load whenever the power control switch 12 is not conducting. In this manner, the energy return switch 26 returns load energy to the load immediately following the opening of power control switch 12.

For many types of loads, when the power control switch 12 ceases conducting, the current in the AC power supply line is suddenly interrupted. The capability of the power control switch 12 to interrupt current in a very short time period can result in large, destructive over-voltage transients in the line voltage due to inductances that exist in the power supply line. If left unabated, the over voltage transients could permanently damage the power control switch 12, and other active devices attached to the power line. To reduce the over voltage transients that appear on the power supply line at the times in each half-cycle when the power control switch 12 ceases conducting, the power control circuitry of the present invention preferably includes a transient suppressor circuit 28 for connection across the AC power line terminals. As will be explained in greater detail below, the transient suppressor circuit 28 includes an active voltage sensitive bilateral switch such so that when the voltage potential between the AC hot and AC common terminal reaches a pre-determined value, the transients suppressor 28 will conduct current until the voltage potential drops below the pre-determined value.

The power output of the power control circuit 10 of the present invention is proportional to the number and duration of pulses from the timer 20 in each half-cycle, which is adjustable over a wide range. Depending on the load used, the power output can be adjusted from almost zero percent to almost a hundred percent of full power.

Figure 3:
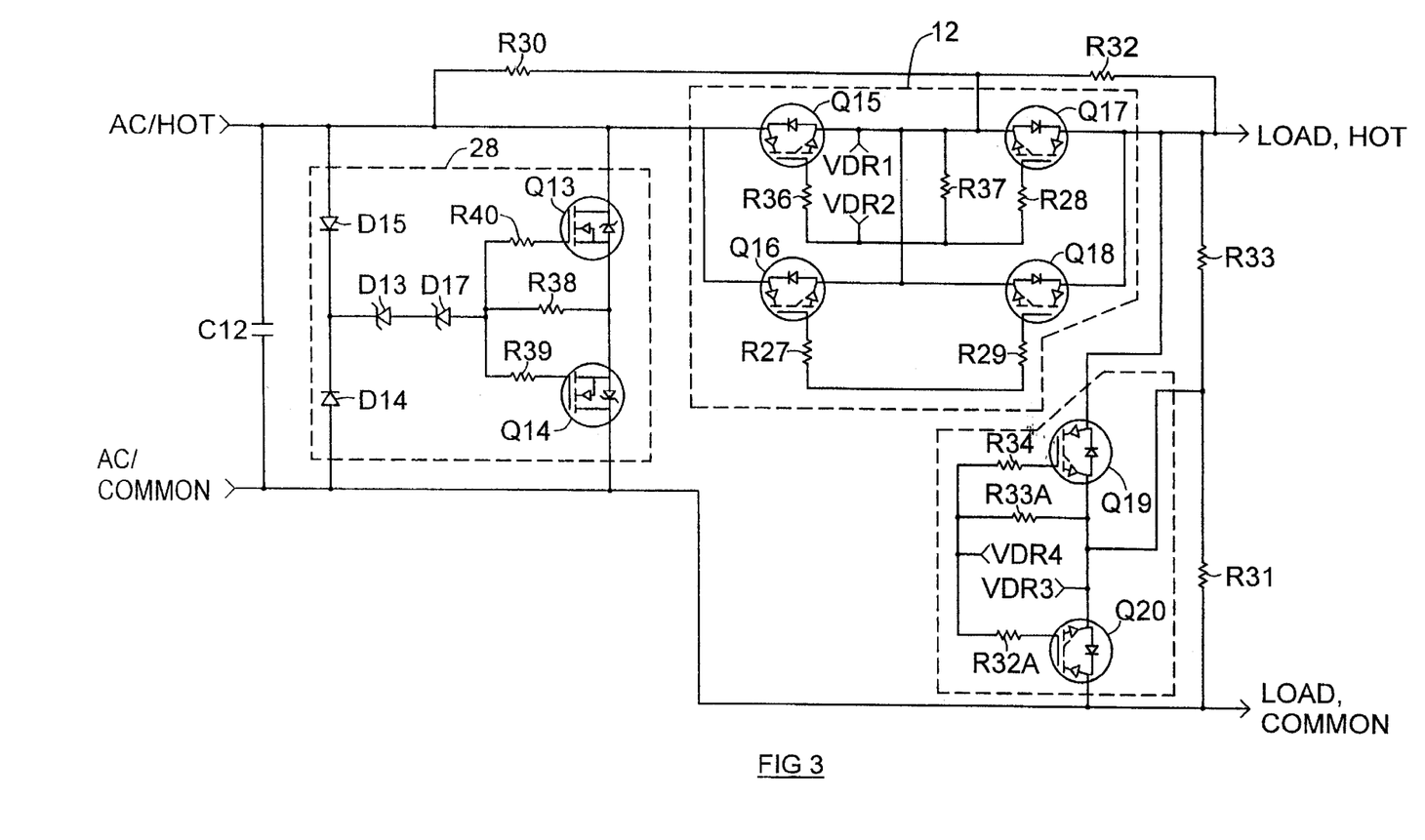
FIG. 3 is a circuit diagram of the power switching section of the power control circuit of FIG. 1.

FIG. 3 shows a preferred embodiment of the power switching section of the power control circuit 10, namely switches 12, 26 and transient suppressor 28. As mentioned above, the bilateral power control switch 12 is connected in series between the AC power supply and the load. The switch 12 includes two series connected FET transistor devices Q15 and Q17, each of which include a reverse poled diode connected across its controlled-conduction circuit, thus permitting each of the transistor devices Q15 and Q17 to conduct a current from emitter to collector. The driver circuit 22 is connected to the power control switch 12 via terminals VDR1 and VDR2, and in particular the drive signal A is provided to the gates of each of the transistor devices Q15 and Q17 through resistors R36 and R28, respectively, via connection VDR2. A resistor R37, which is connected between the gates and emitters of transistor devices Q15 and Q17, provides gate protection when drive signal A is not in use (i.e. during start up and shut down of power). When the drive A signal is high, during the positive half-cycle of line voltage C, current will flow through the channel between collector and emitter of transistor device Q15 and subsequently through the diode included in device Q17. When the drive A signal is high, during the negative half-cycle of line voltage C, current will flow through the channel between collector and emitter of transistor device Q17 and subsequently through the diode of transistor device Q15. When the drive A signal is low, transistor Q15 blocks current flow during the positive half-cycle ofline voltage C, and transistor device Q17 blocks current flow during the negative half-cycle of line voltage C. As illustrated in FIG. 3, the transistor devices Q15, Q17 and resistors R36 and R28 make up a first switching device of the power control switch 12. A second switching. device, provided by transistor devices Q16, Q18 and resistors R27 and R29 is preferably connected in parallel with the first switching device to increase the current carrying capacity of the power control switch 12. The second switching device is identical in operation and construction to the first switching device. The power control switch 12 can include as many parallel connected switching devices as are required to meet the current carrying requirements of the control circuit 10.

The energy return switch 26 is also a bilateral high speed switch, and is connected in parallel with the load 14 to recirculate any stored power in the load when the power control switch 12 ceases conducting. The energy return switch 26 is preferably similar in construction and operation to the switching devices which make up power control switch 12. In this regard, the energy return switch 26 includes two series connected FET transistor devices Q19 and Q20, each of which includes a reverse poled diode connected across its controlled-conduction circuit. The driver circuit 22 is connected via terminals VDR3 and VDR4 to the energy return switch 26 such that the drive signal B is provided to the gates of transistor devices Q19 and Q20 via resistors R34 and R32A, respectively. As in power control switch 12, a resistor R33A provides gate protection during circuit start up and shut down.

The high power transient suppressor 28, which is connected in parallel with the AC supply line, provides high speed sub-microsecond response to voltage transients. The transient suppressor 28 includes two series connected MOSFET transistor devices Q13 and Q14 which each include a reverse polled zenor diode connected across their controlled conduction circuits. The gates of the transistor devices Q13 and Q14 are connected via resistors R40 and R39, respectively, to series connected zenor diodes D13 and D17, which are in turn connected by steering diodes D14 and D15 to the AC supply line. Whenever the line voltage exceeds the combined threshold voltages of zenor diodes D13 and D17, the transistors Q13 and Q14 will each be switched into a conducting state, and when the line voltage is less than the combined thresholds of zenor diodes D13 and D17, the transistor devices Q13 and Q14 will be in an offstate. Diodes D15 and D14 provide polarity steering of the line voltage as provided to the zenor diodes D13 and D17. When transistor devices Q13 and Q14 are each in the "on state" during the positive half-cycle of the AC line voltage, current travels through the channel between drain and source of transistor device Q13 and through the zenor diode of transistor device Q14. When the transistor devices are in the "on state" during the negative half of the AC cycle, current travels through the channel between source and drain of device Q14 and through the zener diode of transistor device Q13. Resistor R38 is included in the transient suppressor 28 to provide automatic decay of any gate signal when no clamping is required.

The power control circuit 10 preferably includes a transistor C12 across the AC input terminals to provide high frequency filtering. As indicated in FIG. 3, resistors R30, R32, R33 and R31 are included to provide charge/discharge control during starting up and open circuit conditions to protect the switching devices of power control switch 12 and energy return switch 26.

Figure 4:
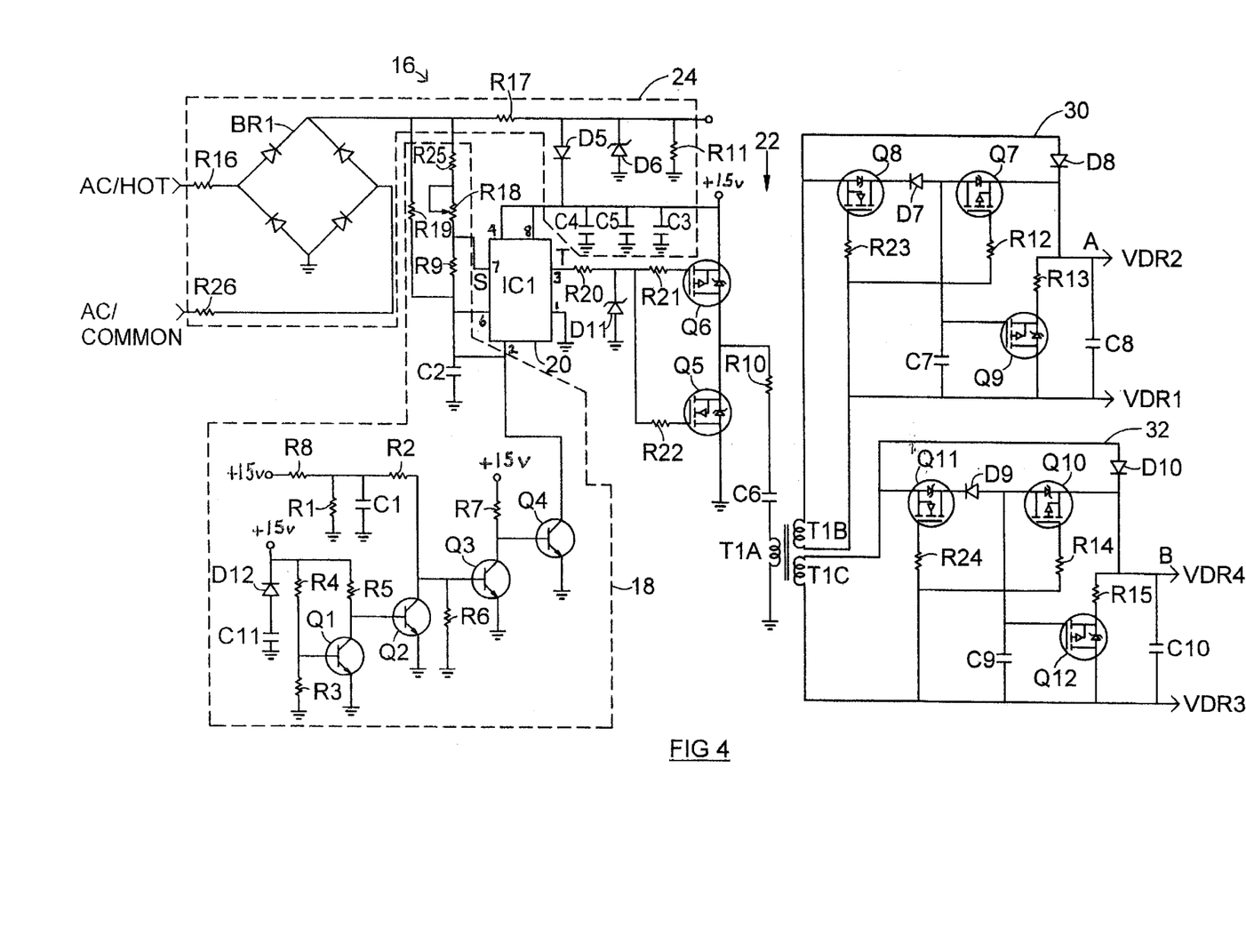
FIG. 4 is a circuit diagram of the switch control circuit of FIG. 1.

With reference to FIG. 4, the switch control circuit 16 of the power control circuit 10 will know be discussed in greater detail. The power supply circuit 24 of the power control circuit includes series limiting resistors R16 and R26, a diode rectifier bridge BR1, resistors R11 and R17, diode D5, zenor diode D6, and parallel capacitors C4, C5 and C3. The resistors R16 and R26 are low power resistors and connected to the AC terminals of the diode bridge and are utilized to drop AC supply line potential to 15 volts, thus eliminating the need for a a power transformer to drop the line voltage down to a level suitable for the switch control circuit 16. The power supply circuit 24 is configured to supply a 15 volt power signal and a current of approximately 6 milliamps from a conventional 120 volt line. In this respect, the power supply 24 has very low power usage.

The timer 20 is preferably implemented using an off-the-shelf chip IC1 such as a '555 timer' and is a low power precision timer which runs in triggered astable mode. The timing signal T of the timer 20 is output on pin 3 to driver circuit 22, and the sync signal S is input to the timer at pin 7. The sync signal is provided by synchronization circuit 18 which includes resistors R1, R2, R3, R4, R5, R6, R7, R8, R9, R19 and R25, potentiometer R18, diode D12, capacitors C1, C2 and C11 and transistors Q1, Q2, Q3 and Q4. The components of the synchronization circuit 18 provide oscillation RC time constants, and also provide negative feedback for variable line voltage compensation. The potentiometer R18 adjusts position and pulse duration of the timer signal T. The resistor R9 connected between pins 6 and 7 of the timer 20 controls the number of pulses output during each half-cycle of the AC line voltage and in the embodiment illustrated the timer 20 produces 2 pulses per half wave as shown in FIG. 2. Preferably, when the power control circuit 10 of the present invention is configured for use with ballasted light fixtures such as flourescent, high pressure sodium or metal halite, it is configured to produce at least two pulses to the load per half cycle in order to prevent de-ionization of such lights.

The combination of transistors Q1 and Q2 is used to shut-down output of the synchronization circuit during initial setup or power loss time. It will be appreciated that when the power control switch 12 closes, it does not close instantaneously, but it rather closes over a fraction of a second with many on-off bounces. When initially closed, the first bounce lasts as much as several hundred milliseconds, and the rest of the circuit needs to be protected from false triggering because it operates with times of less than one millionth of a second.

Transistors Q3 and Q4 provide synchronization. Since the switch control circuit 16 is not sensitive to input power frequency, or power line level, it will operate with line voltages at 50 or 60 Hz and other frequencies as well, with simple adjustment of potentiometer R18.

Diode D12 provides for fast shut-down of the power control circuit 10 in the event that power loss occurs.

As mentioned above, the timing signal T is output to the driver circuit 22 on pin 3 of timer circuit 20. The output pulse on pin 3 is preferably a square wave which switches between zero and fifteen volts. The driver circuit 22 includes a transformer T1 having a single primary winding T1A, and two secondary windings T1B and T1C which are connected in equivalent but opposite polarity. The transformer T1 is included to isolate the majority of the switch control circuit 16 from the power control switch 12 and the energy return switch 26. Between the output of pin 3 of timer circuit 20 and the primary winding T1A of transformer T1, the driver circuit 22 includes resistors R10, R20, R21 and R22, capacitor C6, zenor diode D11, and transistor devices Q5 and Q6. The resistor R20 and zenor diode D11 are included to provide transistor gate protection. The resistors R21, R22 and transistor devices Q5 and Q6 amplify the power of the signal T and feed it to resistor R10. The resistor R11, capacitor C6 and primary winding T1A convert edge information of the pulse T to magnetic field strength. The secondary windings T1B and T1C are connected in equivalent but opposite polarity to gate drive circuits 30 and 32 which provide drive signal A and drive signal B, respectively. The gate drive circuit 30 for providing drive signal A includes resistors R12, R13, R23, capacitors C7 and C8, diodes D7 and D8, and MOSFET transistor devices Q7, Q8 and Q9. These components serve to shape the pulse generated across the secondary winding T1B to provide drive signal A.

Transistor devices Q7, Q8 and Q9 provide active control of the pulse from the transformer T1 and the diode D8 charges the output switch gate across capacitor C8 to a typical plus 12 volts. Capacitor C7 and transistors Q7, Q8 and Q9 provide the off-pulse to gate by discharging the capacitor C8 to zero volts and maintaining it there until the next pulse. The off-signal is stored in capacitor C7.

The gate drive circuit 32 used to provide the drive signal B is identical to that used to provide the drive A signal and includes resistors R14, R15, R24, capacitors C9 and C10, diodes D9 and D10, and transistor devices Q10, Q11 and Q12.

The switch control circuit 16 is configured so that when the power control switch 12 turns off, the energy return switch 26 will be turned on within a few nanoseconds to recirculate energy. The RC timing of the respective gate driver circuits ensures that the power control switch 12 and the energy return switch 26 are not on at the same time by ensuring that the "on" edge is slower than the "off" edge.

In the described embodiment, the duration of the pulses from the timer 20 is controlled by potentiometer R18, which may be external to the circuit, to allow for manual adjustment of the power delivered to a load. Alternatively, use of a photosensitive resistor or thermally sensitive resistor in place of the potentiometer 18 would allow the power delivered to the load to be determined by light level or temperature. For example, the photosensitive resistor could be made operable to react to the ambient or outside light levels, thereby increasing the power output level if the ambient light is held below a certain level. Similarly, it would be possible to provide for light level feedback to achieve a constant illumination level, with the addition of a suitable light detector in associated feedback circuit.

In implementing the circuits of FIGS. 3 and 4, good results were obtained using the component values as follows, for a 20–40 AMP system with 120 VAC line:

Resistors
R1 47.5K
R2 15.0K
R3 5.11K
R4 68.1K
R5 27.4K
R6 3.92K
R7 10.0K
R8 15.0K
R9 7.5K
R10 1.0
R11 27.4K
R12 475
R13 10.0
R14 475
R15 10.0
R16 7.5K/3 W
R17 5K/5 W
R18 100K (adjustable)
R19 10M
R20 10.0
R21 10.0
R22 10.0
R23 475
R24 475
R25 47.5K
R26 7.5K/3 W
R27 10.0
R28 10.0
R29 10.0
R30 51K/5 W
R31 51K/W
R32 51K/5 W
R32A 10.0
R33 51K/5 W
R33A 2.2M
R34 10.0
R36 10.0
R37 2.2M
R38 1.0K
R39 100
R40 100
CAPACITORS
C1 0.022 $\mu$F
C2 0.033 $\mu$F
C3 47 $\mu$F
C4 1 $\mu$F
C5 1 $\mu$F
C6 1 $\mu$F
C7 1 $\mu$F
C8 1 $\mu$F
C9 1 $\mu$F
C10 1 $\mu$F
C11 22 $\mu$F
C12 5 $\mu$F
TRANSISTORS
Q1 MPS2222A
Q2 MPS2222A
Q3 MPS2222A
Q4 MPS2222A
Q5 IRFD120
Q6 IRFD120
Q7 IRFD9110
Q8 IRFD120
Q9 IRFD9110
Q10 IRFD9110
Q11 IRFD120
Q12 IRFD9110
Q13 IRFPE40
Q14 IRFPE40
Q15 IRG4PH40UD
Q16 IRG4PH40UD
Q17 IRG4PH40UD
Q18 IRG4PH40UD
Q19 IRG4PH40UD
Q20 IRG4PH40UD
DIODES
BR1 IN4148
D5 IN4007
D6 IN4743
D7 IN4148
D8 IN4148
D9 IN4148

D10 IN4148
D11 IN4743
D12 IN4007
D13 IN4747A
D14 IN4007
D15 IN4007
D17 IN5281

In a preferred embodiment of the invention designed to reduce power consumption by fluorescent lights, a notch of missing power (as illustrated at the bottom of FIG. 2) is created which is one (1) milli-second wide and which starts at four (4) milli-seconds from the zero cross of the sine wave for 50/60 hz power. This preferred power control circuit prevents a pulse or power from getting to the lighting load with a specific width and position during the plus (+) and minus (−) side of the AC current and gives approximately 30% power reduction when used with regular fluorescent tubes having magnetic ballasts. This preferred embodiment of the invention also allows the fluorescent lamps to ignite at this setting of the power control circuit without having to go to full power, or without a warm up period. This preferred embodiment also provides a capacitive power factor of about −0.78. The purpose of the timing of four (4) milli-seconds is to notch the power after the peak in order to obtain a capacitive power factor. Notching before the peak will give an inductive power factor. Notching on both sides of the peak will give you a neutral or unity power factor. The pulse width is preferably kept at one (1) milli-second in this version to prevent de-ionization of the fluorescent tubes. A longer pulse width would give a larger power reduction, but may cause some marginal or weak tubes to drop off.

It should be noted that the aforementioned one (1) milli-second pulse width can be repeated in the ratio of one (1) milli-second on to one (1) milli-second off up to as much as four (4) or five (5) notches over the whole half cycle. This will give a power reduction in the 85–90% range without the tubes dropping out, flickering, or without requiring a warm up period.

A narrower pulse width can be used to achieve more specific performance on fluorescent or high intensity discharge (HID) lighting. For HID power control purposes, it is best to use a single pulse of no more than one (1) milli-second and preferably less than one (1) millisecond so as to not to disrupt the internal inductive/capacitive resonance used in some of these types of lighting.

It should also be noted that for purposes of the present invention where a notch is taken out of the power, there should be a closing conduction path across the load to maintain current flow for the energy stored within the load as taught in U.S. Pat. No. 5,455,491 issued Oct. 3, 1995. Also, power losses within the power control circuit can be kept to between 1–4% or lower with a typical 20 amp circuit load of fluorescent lighting with the actual power loss depending upon the line voltage. For example the power loss would be about 1% for a 347 volt line and would increase to about 4% for a 120 volt line with a typical 20 AMP circuit load of fluorescent lighting.

The present power control circuit of the invention has been shown to function with most types of ballasts and flourescent loads already in existence. The circuits described above and illustrated in the present application can incorporate and employ the above described preferred width for the notch and the timing for the start of the notch.

The high power transient suppression protection circuitry 28 must be included to prevent input voltage over-shoot caused when the supply line with its typical inductive component is stopped from conducting current. The relationship is:

voltage=inductance×the rate of change of the current which is controlled by the high speed power switch. A small capacitor i.e. 5 uf, in conjunction with the existing line inductance on the line will remove the high frequency component and will minimize/eliminate radio frequency interference.

The power control circuit of the present invention will allow power reduction in fluorescent and will minimize/eliminate radio frequency interference.

The power control circuit of the present invention will allow power reduction in fluorescent and HID lighting without wiring modifications, except to introduce the unit with three wires plus a ground at a main panel between the existing breakers and the load(s). Secondary wiring, wall switches, etc. can be left as is. Because the unit prevents de-ionization, no warm-up period is required, full power to the lamps before set-back is not required, and with multiple pulses, power can be controlled down to as low as a few percent power with the fluorescent light still on and without any flickering.

It will be understood that by removing power after the peak of the sine wave using the power control circuit of this invention, there is created a capacitive power factor component which offsets the usual existing inductive power factor component. The substantial advantage to be gained is an overall energy cost saving by a reduction of rate penalties.

Another advantage of this invention is that by reducing the amount of power required there is a resulting reduced temperature of the ballast used for the lighting and this should extend component life. Use of the present invention also permits all existing on/off switches, fluorescent tubes and ballasts on the circuit to be used without re-wiring or any changes in the power setting.

The present invention can be used with inductive loads with the effect that by placing the power stoppage after the peak point, one can make an inductor with its inherent inductive power factor appear capacitive to the power line, with its implied benefits of power control, energy savings, power factor corrections and the attendant dollar savings.

As will be apparent to those skilled in the art in the light of the foregoing disclosure, many alterations and modifications are possible in the practice of this invention without departing from the spirit or scope thereof Accordingly, the scope of the invention is to be construed in accordance with the substance defined by the following claims.

What is claimed is:

1. A power control circuit for connection to an AC supply circuit for supplying AC current to a load, comprising:

a bilateral, very high speed power control switch for connection in series with the load;

a bilateral, very high speed energy return switch for connection in parallel with the load;

a driver circuit connected to each of said power control switch and said energy return switch for controlling the opening and closing of said switches, said driver circuit being configured to cause said energy return switch to be open when said power control switch is closed and said energy return switch to close when said power control switch opens;

a timer circuit operatively connected to said driver circuit for controlling the operation of said driver circuit so that said power control switch is closed for at least a predetermined initial time period and a discrete predetermined final time period during each half cycle of the AC current; and a power supply circuit for connection to the AC supply circuit for supplying power to said driver circuit and said timer circuit.

2. A power control circuit according to claim 1 including:

a bilateral, high power transient suppressor switch for connection across the AC supply circuit; and monitoring means operatively connected to said suppressor switch for monitoring the potential across the AC supply circuit and causing said suppressor switch to conduct when said potential exceeds a predetermined value.

3. A power control circuit according to claim 1 wherein said power supply circuit is a low power consumption circuit that includes low power resistors for connection in series with the AC supply circuit for reducing an AC line voltage to a voltage level suitable for application to said driver circuit and said timer circuit.

4. A power control circuit according to claim 1 wherein said driver circuit includes an isolation transformer for isolating said timer circuit from said power control and energy return switches.

5. A power control circuit according to claim 1 wherein said power control switch is open between said initial time period and said final time period for an open period of one milli-second or less in order to reduce power and prevent de-ionization of a fluorescent lighting or HID load.

6. A power control circuit according to claim 5 wherein said power control circuit is open for said open period after a peak in each half cycle of the AC current which is in the form of a sine wave in order to create a capacitive power factor.

7. A power control circuit according to claim 6 wherein, when said power control circuit is used in an AC supply circuit supplying current to a flourescent lighting load, the power control circuit is capable of achieving a reduction of 90% or more of power without light flickering or a drop-off of fluorescent lamps.

8. A power control circuit according to claim 5 wherein said power supply circuit is a low power consumption circuit that includes a low power resistor means for connection in series with the AC supply circuit for reducing an AC line voltage to a voltage level suitable for application to said driver circuit and said timer circuit.

9. A power control circuit according to claim 3 including a transient suppressor circuit comprising:

a bilateral, high power transient suppressor for connection across the AC supply circuit; and monitoring means operatively connected to said suppressor for monitoring the potential across the AC supply circuit and causing said suppressor to conduct when said potential exceeds a predetermined value.

10. A power control circuit according to claim 3 wherein said power control switch is open for an open period of one milli-second or less during each half cycle in order to reduce power and prevent de-ionization of a fluorescent lighting or HID load.

11. A power control circuit according to claim 10 wherein said power control circuit is open for said open period after a peak in each half cycle of the AC current which is in the form of a sine wave in order to create a capacitive power factor.

12. A power control circuit according to claim 1 wherein said power control circuit is able to provide normal functioning of the AC supply circuit without a warm-up and without re-wiring of the system to which the control circuit is connected.

13. A power control circuit according to claim 1 wherein said power control circuit in use achieves a reduction of power which in turn results in reduced temperature of ballast connected to the AC supply circuit, thereby extending component life.

14. A power control circuit according to claim 1 wherein when said power control circuit is used in an AC supply circuit supplying current to lighting lamps, said lamps are able to ignite at a pre-set power level without having to go to full power before set back.

15. A power control circuit according to claim 1 wherein when said power control circuit is connected to an AC supply circuit connected to fluorescent tubes and ballasts and on/off switches, said switches, fluorescent tubes, and ballasts can remain connected to the AC supply circuit without re-wiring and without changes in the power setting.

16. A power control circuit according to claim 1 wherein, when said power control circuit is connected to an AC supply circuit that is connected to inductive loads and open for an open period after a peak in each half cycle of the AC current, said inductive loads with their inherent inductive power factor appear capacitive to the power line, resulting in power control benefits, energy savings, and power factor corrections.

\* \* \* \* \*